United States Patent [19]

Henderson et al.

[11] 4,368,415
[45] Jan. 11, 1983

[54] CONVERTING SOLAR POWER TO ELECTRIC POWER

[75] Inventors: Ross A. Henderson, St. Werburghs; Douglas A. Gregory, Long Ashton, both of England

[73] Assignee: British Aerospace, Weybridge, England

[21] Appl. No.: 187,447

[22] Filed: Sep. 15, 1980

[30] Foreign Application Priority Data

Sep. 14, 1979 [GB] United Kingdom ................ 7931895

[51] Int. Cl.$^3$ .......................... B64G 1/10; B64C 39/02
[52] U.S. Cl. ............................... 322/2 R; 244/158 R; 244/173; 310/306
[58] Field of Search ....................... 322/2 R; 310/306; 244/158, 173, 24, 33

[56] References Cited

U.S. PATENT DOCUMENTS 3,781,647 12/1973 Glaser ...................................... 322/2
3,933,323 1/1976 Dudley et al. ........................ 322/2 R
4,138,517 3/1982 Salkeld et al. ................... 244/158 R
4,305,555 12/1981 Davis .............................. 244/158 R

OTHER PUBLICATIONS

"Power From Space By Laser", Bain, Astronautics and Aeronautics, Mar. 1979, pp. 27-40.
"The Laser Future", Gerry & Rather, Astronautics and Aeronautics, Mar. 1979, pp. 60-67.
"The TELEC"-A Plasma Type of Direct Energy Converter, Britt, pp. 421-437 of Radiation Energy Conversion In Space, Am. Institute of Aeronautics and Astronautics (1978) Billman, Ed.
"Lighter Than Air", Okress et al., pp. 81-91.
"The Construction Specifier", Jan. 1980.
"The Franklin Institute Has High Hopes For Its Big Balloon", Okress, pp. 41-46, IEEE Spectrum Dec. 1978.
"The Wither And Whether Of Adaptive Optics", Pearson, pp. 2-10, Proc. Soc. Photo-Opt. Inst. Engrs., vol. 179, 1979.
"New Developments In Deformable Surface Devices", Everson, pp. 11-15, SPIE, vol. 141, Adaptive Optical Components (1978).
"Historical Review of Adaptive Optics Technology", Marguet, pp. 2-10, SPIE, vol. 141, Adaptive Optical Components (1978).
"Ground-to-Space Optical Power Transfer", Mevers et al., pp. 108-117, SPIE, vol. 141, Adaptive Optical Components (1978).

Primary Examiner—R. J. Hickey
Attorney, Agent, or Firm—Cushman, Darby & Cushman

[57] ABSTRACT

Solar energy is collected by collector means supported in space by geostationary satellite and directed to an air buoyant intermediate platform at a position within the upper atmosphere. The laser energy is there converted to microwave energy and beamed down to earth.

2 Claims, 1 Drawing Figure

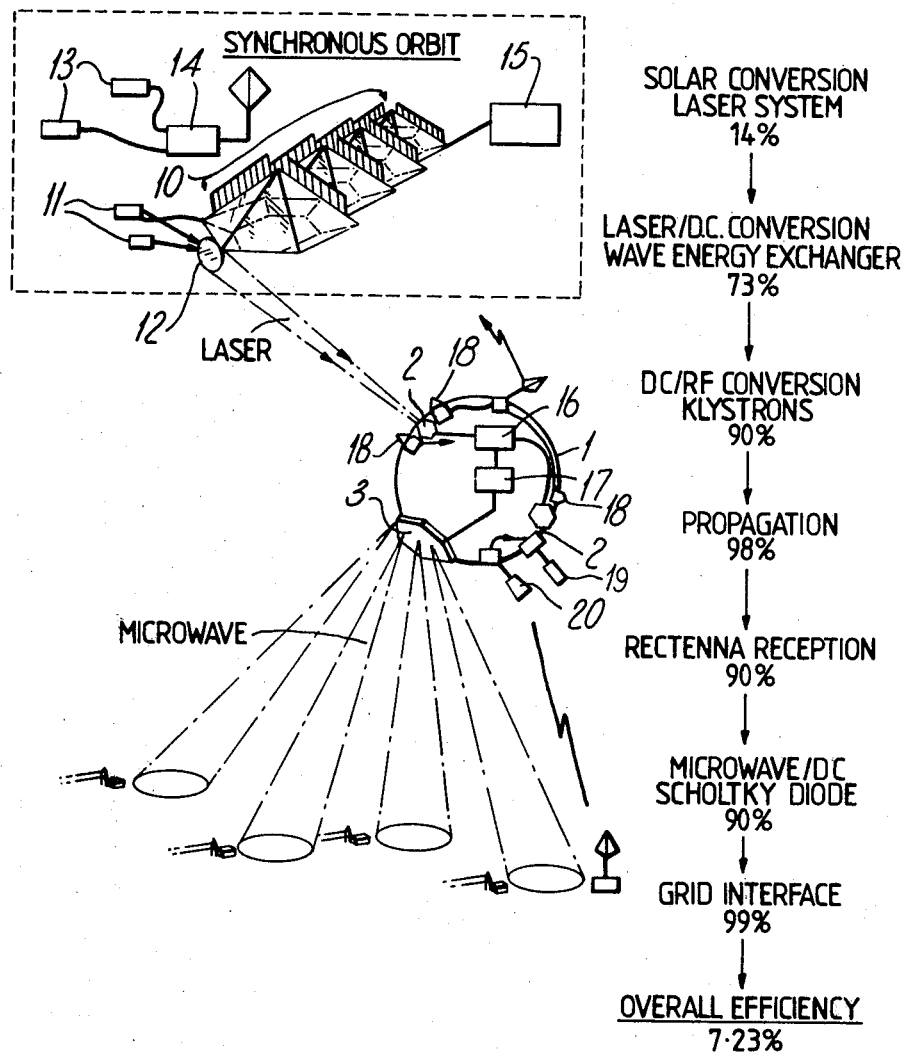

CONVERTING SOLAR POWER TO ELECTRIC POWER

The invention relates to method and means for converting solar energy into electrical power and is particularly concerned with providing a system which is safe and economic.

Systems of the type with which this application is concerned utilise a solar array held in space as efficient means for collecting solar radiation. As an example U.S. Pat. No. 3,781,647 proposes the use of a geo-stationary satellite system in which solar power is collected by a solar array attached to and forming part of said satellite together with means for transforming the solar power to microwave energy which is then beamed to the Earth and collected by multiple rectenna.

However while such systems are perhaps suitable for the lower latitudes where large areas of unoccupied land exist alongside densely populated areas, the required area of rectenna with additional protected security boundary becomes disproportionally large at Northern European latitudes.

This problem is compounded by the fact that it is expensive and inefficient to lay land power lines to carry power from unoccupied land to areas needing large amounts of power.

It is not possible to reduce the microwave reception area by reducing the total energy received as this area is governed directly by the transmitted distance and inversely by the transmission dish size or the radiation frequency.

It therefore becomes desirable to reduce the transmitted distance and to increase the radiation frequency.

An alternative which has been proposed is to use a laser beam to carry the energy directly from the satellite to the surface of the Earth, which could materially reduce the cost, weight and size of the apparatus and give greater versatility in siting.

However such transmission of the high power involved introduces unacceptable hazards to human and animal life as well as to aircraft, buildings and combustible material.

Furthermore a major disadvantage is the absorption of laser radiaton in the atmosphere where the effects of dust, cloud, rain, smoke etc. severely alternate incoming beams of high frequency.

Other problems associated with the use of lasers are thermal blooming where a change in the refractive index causes beam bending and wander, and shadow bands and intensity/phase faults that may occur in the beam.

Additionally it becomes necessary to make the rectenna area additionally secure by the use of a perimeter fence which is opaque to the beam.

The present invention seeks to provide a system which overcomes these difficulties by utilising an intermediary platform between the satellite and the Earth, said platform preferably being placed above the troposphere, and made capable of carrying means by which laser energy beamed to it from the satellite is converted into microwave energy which is then beamed down to rectenna on the Earth.

In a preferred form the intermediate platform is made as a balloon type structure utilising hot air as the medium for obtaining lift with laser powered engines for controlling elevation and altitude with waste heat produced by laser/microwave conversion forming a significant part of the energy source.

For a better understanding of the invention reference will be made by way of example, to the drawing which shows, in diagrammatic form, one embodiment of a solar power system and method.

As shown in the drawing, the intermediate platform 1 comprises a hot-air "balloon" carrying one or more laser beam receivers 2 and a microwave antenna or dish 3. Preferably it would have two envelopes to minimise heat losses. It would ascend by solar-heated air from a water or ground-assembly site to controlled altitudes in the stratosphere. The inner envelope, containing the heated air, would not be capable of distending or collapsing to accomodate degrees of inflation, since the air pressure inside the concentric envelopes, between them and outside the craft would be the same by virtue of an open, or vented, constant-volume aerostatic system. The two envelopes, constructed of 1-mil mylar film would be separated by air at ambient pressure. The separation—which thermodynamically need be only a foot or so at an altitude of 30 Km. but, in practice, would probably be larger—minimizing heat loss.

The basic structure, could be a modified version of a geodesic support of the kind disclosed in the articles "The Franklin Institute has high hopes for its big balloon" (Okress, IEEE Spectrum, Vol. 13, No. 12; pp. 41-46; Dec. 78) and "Lighter Than Air" (Okress et al, Construction Specifier Magazine, January 1980, pp. 81-91) and called a "tensegrity" hollow shell. The sphere is relatively resilient and of much lower mass than regular geodesic spheres of the same diameter and resiliency. Further, the tensegrity geodesic sphere can be built up from basic modules to extremely large sizes.

Since all areas of the craft would be at ambient pressure and since it could be manoeuvred to altitudes where wind velocity and dynamic air pressure were effectively zero, there would be negligible pressure differentials to disturb the replacement of modular segments. The craft would descend very slowly if one segment were missing, since warm airflow through a gap in a single module to the outside atmosphere would have little effect on buoyancy. Once at stratospheric altitudes, the aircraft could remain aloft indefinitely. A minimum lifetime of ten years seems reasonable.

For the overall system shown in the Figure, there is assumed a total grid input of 5 GW at four rectenna sites of 1.25 GW.

The Overall System Efficiency is: $5.0/69.17 = 7.23\%$ which is comparable with microwave SPS systems efficiency of 7.1%.

A further important factor is the waste heat energy available at the various stages. At the laser conversion stage, at satellite level, 4.16 GW heat must be removed continuously by radiation in order to keep the laser cool. A radiator array of 0.07 $Km^2$ area is required.

Power for life support, laboratory facilities, manoeuvring system, etc. on the balloon platform could be supplied from the 3.32 GW waste heat due to laser/d.c.-/microwave conversion. Excess heat energy must be dissipated by radiators.

Laser Transmission System

Transmission aperture over-heating may be avoided by using many small apertures as disclosed by C. N. Bain in "Power from space by laser" (Astron, Aeron. 3; 28-40, March 1979), focused at the balloon receiving array. For the 5 GW system a total transmit array diameter of approximately 40 m. is sufficient. This yields a power flux of 3.98 MW/m² (398 W/cm²) which is well inside the limits to avoid over-heating. The diffraction spread of a laser aperture is shown by Gerry and Rather in "The laser future" (Astron, Aeron. 3, 60–67, 1979) to be given by:

$$d = 2.44 \lambda / D_r R q$$

d = receiver diameter
$\lambda$ = transmission wavelength = 10.6 $\mu$m.
$D_r$ = transmission aperture diameter = 40 m.
R = altitude range
q = beam quality factor 1.

The satellite is in geosynchronous orbit at 35,880 km. altitude. The range R to the balloon is therefore approximately 35,850 km.

$$d = 2.44 \; 10.6 \times 10^{-6} \; 35,850 \cdot 10^3 . 1.$$
$$= 23.2 \text{ m}$$

Hence Laser transmission dish = 40 m diameter.
Laser reception dish = 23.2 m diameter.

Initial assessment of the control requirements for the laser beam, balloon receiver/transmitter and ground receiver indicate feasibility. Closed loop control systems, using the laser as a reference, with sensors on the balloon controlling the laser heads, and between the balloon and ground rectenna, using an inertial navigation system, radar tracking, or a satellite navigation system, seem reasonable options.

The satellite shown comprises a solar array 10 which is coupled to drive a series of lasers 11, for example CO or $CO_2$ lasers or what are known as free electron lasers, of which the beams are directed towards a transmission mirror 12. The mirror 12 is a controllably deformable mirror which can be deformed to control the focus and shape of the composite beam. Such mirrors are known, for example, examples are disclosed in the transactions of the Society of Photographic and Instrument Engineers SPIE Vol. 179 entitled "Adaptive Optical Components II" (1979), for example the Pearson article "The Wither and Wether of Adaptive Optics" pages 2–10. The satellite further comprises a retro-rocket guide system 13 and a command radio receiver 14 for receiving command signals from the intermediate platform 1.

Instead of comprising a solar array 10, the satellite could comprise a focussing system for the suns rays and a series of lasers of the kind which can be directly pumped by solar energy as disclosed in the aforementioned references to Gerry and Rather and to Bain.

The satellite further comprises the aforementioned heat radiator array 15 to get rid of excess heat from the satellite.

At the balloon 1, the laser energy is collected by the collectors 2 is converted to electrical power by a generator 16 such as those disclosed by Bain above, e.g. a potassium vapour boiler in combination with a Magneto-Hydro-dynamic generator or Rankine binary cycle turbine generator, or a thermo-electric, for example, a "Telec" as disclosed by Britt in pages 421 to 437 of "Radiation energy conversion in Space" (A1AA; Vol. 61; 1978 edited by K. W. Billman), which is able to use the heat of the laser beam to generate electricity directly. The electrical power is passed to a microwave generator 17 of a kind known in the art and the generated microwave energy is passed to the transmitting dish. Arranged near the laser collector(s) are light sensors 18 which are operable to provide signals indicative of defocussing or movements of the laser beam off the axis of each collector. These signals are passed to a telecommand transmitter which, in response thereto, is operable to transmit command signals up to the satellite's command receiver 14 which then controls the guide system 13. The balloon 1 also has guide thrusters 19, which may be electro-magnetic thrusters known in the art, for maintaining it in its desired position above the earth. These thrusters may be controlled by a crew on board the balloon or by way of a telecommand link 20 from the ground.

To control the direction of the microwave beam, the transmitting antenna system may be a phased array, for example a single dish with multiple feed elements, the relative excitation levels of which are controlled from the ground by the telecommand link 20.

We claim:
1. A solar energy system comprising:
   a space vehicle supporting means for collecting solar energy and laser means for using the collected solar energy to form a laser beam directed towards a receiving position within the upper atmosphere of the earth,
   an air-buoyant intermediate station for floating at said position within the upper atmosphere and supporting means for receiving said laser beam, means for converting the energy of the laser beam to microwave energy, and means for directing said microwave energy as a beam towards a ground receiving position on the earth's surface, and
   microwave energy receiving antenna means at said ground receiving position.
2. A method of providing energy, the method comprising:
   Collecting solar energy at a position in space, using such energy to form a laser beam and directing said beam towards a receiving position in the upper atmosphere of the earth,
   receiving the beam at said position by laser energy collecting means supported by an air-buoyant intermediate station,
   converting the laser energy to a beam of microwave energy and directing the beam towards a ground receiving position on the earth's surface, and
   receiving said microwave energy beam by means of an antenna system at said ground receiving position.

* * * * *